United States Patent
Lim et al.

(10) Patent No.: US 12,417,243 B2
(45) Date of Patent: Sep. 16, 2025

(54) METHOD AND ELECTRONIC DEVICE FOR GENERATING CONTENT BASED ON CAPACITY OF EXTERNAL DEVICE

(71) Applicant: Samsung Electronics Co., Ltd., Suwon-si (KR)

(72) Inventors: Jinho Lim, Suwon-si (KR); Jongbo Moon, Suwon-si (KR); Joohong Lee, Suwon-si (KR); Sangwon Chae, Suwon-si (KR); Chanmin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 439 days.

(21) Appl. No.: 17/864,820

(22) Filed: Jul. 14, 2022

(65) Prior Publication Data

US 2023/0026123 A1    Jan. 26, 2023

Related U.S. Application Data

(63) Continuation of application No. PCT/KR2022/007480, filed on May 26, 2022.

(30) Foreign Application Priority Data

Jul. 14, 2021 (KR) .................. 10-2021-0092452

(51) Int. Cl.
*G06T 13/40* (2011.01)
*G06F 16/11* (2019.01)
(Continued)

(52) U.S. Cl.
CPC ........ *G06F 16/5862* (2019.01); *G06F 16/116* (2019.01); *G06T 9/00* (2013.01); *G06T 11/60* (2013.01)

(58) Field of Classification Search
CPC ........................................... G06T 5/50
See application file for complete search history.

(56) References Cited

U.S. PATENT DOCUMENTS

| 7,590,310 B2 * | 9/2009 | Retterath ............ G06F 16/5838 382/190 |
| 10,891,367 B2 | 1/2021 | Fram |

(Continued)

FOREIGN PATENT DOCUMENTS

| CN | 104284131 A | 1/2015 |
| CN | 112750176 A | 5/2021 |

(Continued)

OTHER PUBLICATIONS

International Search Report dated Aug. 23, 2022, issued in International Patent Application No. PCT/KR2022/007480.

*Primary Examiner* — Di Xiao
(74) *Attorney, Agent, or Firm* — Jefferson IP Law, LLP

(57) ABSTRACT

An electronic device is provided. The electronic device includes a communication module, a camera module, a memory configured to store capability-related information about an external electronic device and information related to content, and a processor configured to be operatively connected to the communication module, the camera module, and the memory. The processor may generate at least one first content corresponding to a user using the camera module, may convert the at least one first content into at least one second content, based on the capability-related information about the external electronic device and the information related to the content, and may transmit the converted at least one second content to the external electronic device through the communication module.

18 Claims, 13 Drawing Sheets

(51) Int. Cl.
*G06F 16/583* (2019.01)
*G06T 9/00* (2006.01)
*G06T 11/60* (2006.01)

(56) References Cited

U.S. PATENT DOCUMENTS

| | | | |
|---|---|---|---|
| 11,043,190 B1* | 6/2021 | Broderick | G06F 3/1423 |
| 2013/0038601 A1 | 2/2013 | Han et al. | |
| 2014/0168216 A1 | 6/2014 | Kim et al. | |
| 2018/0270448 A1* | 9/2018 | Onuma | H04N 7/18 |
| 2019/0180489 A1* | 6/2019 | Antonyan | G06T 11/001 |
| 2019/0255439 A1 | 8/2019 | Nakagawa et al. | |
| 2020/0391114 A1 | 12/2020 | Sefcik et al. | |
| 2021/0005003 A1 | 1/2021 | Chong et al. | |
| 2021/0027513 A1 | 1/2021 | Choi et al. | |
| 2021/0089706 A1 | 3/2021 | Kellum et al. | |
| 2021/0304452 A1* | 9/2021 | Lee | G06T 7/50 |

FOREIGN PATENT DOCUMENTS

| | | | | |
|---|---|---|---|---|
| EP | 2688295 A2 * | 1/2014 | | G06F 3/041 |
| JP | 2018-057981 A | 4/2018 | | |
| KR | 10-2014-0022670 A | 2/2014 | | |
| KR | 10-1671900 B1 | 11/2016 | | |
| KR | 10-1699930 B1 | 1/2017 | | |
| KR | 10-1711684 B1 | 2/2017 | | |
| KR | 10-2018-0012166 A | 2/2018 | | |
| KR | 10-2020-0053232 A | 5/2020 | | |
| KR | 10-2241153 B1 | 4/2021 | | |
| WO | WO-2021252343 A1 * | 12/2021 | | |
| WO | WO-2022175717 A1 * | 8/2022 | | |

* cited by examiner

METHOD AND ELECTRONIC DEVICE FOR GENERATING CONTENT BASED ON CAPACITY OF EXTERNAL DEVICE

CROSS-REFERENCE TO RELATED APPLICATION(S)

This application is a continuation application, claiming priority under § 365(c), of an International application No. PCT/KR2022/007480, filed on May 26, 2022, which is based on and claims the benefit of a Korean patent application number 10-2021-0092452, filed on Jul. 14, 2021, in the Korean Intellectual Property Office, the disclosure of which is incorporated by reference herein in its entirety.

TECHNICAL FIELD

The disclosure relates to a method and an electronic device for generating content based on a capability of an external device.

BACKGROUND ART

An electronic device may generate an avatar to replace a user using a user image or may receive various characters (e.g., a character resembling a celebrity) to be used as avatars from the outside through a network. The electronic device may use an emoticon, a sticker, and/or an avatar, instead of text, as an auxiliary method of communication in a cyberspace. The electronic device may easily convey a user's emotion, feeling, or thought using an avatar. The electronic device may provide various services using an avatar, for example, avatar filming, a social networking service/site (SNS), or a messenger service, to the user.

According to an embodiment, the electronic device may generate an avatar (e.g., a three-dimensional (3D) model avatar and/or an augmented reality (AR) emoji) while achieving an optimized quality, based on specifications and capabilities of the electronic device, and may provide the avatar of an optimized quality to the user. Technological development improves the capability of a graphics processing unit (GPU) forming the electronic device, and the electronic device may generate a high-resolution avatar. For example, the mesh of an avatar may include about 20,000 or more vertices, and the texture of an avatar may have a resolution of 1K*1K (i.e., 1024*1024) or more.

The above information is presented as background information only to assist with an understanding of the disclosure. No determination has been made, and no assertion is made, as to whether any of the above might be applicable as prior art with regard to the disclosure.

DISCLOSURE

Technical Problem

Since an electronic device generates an avatar corresponding to a specification and a capability of the electronic device, a large data size, a high-level rendering processing capability, and a high-level memory capacity are required. An external electronic device (e.g., a wearable device, a watch, and/or AR glasses) linked with the electronic device may have a specification and a capability relatively lower than those of the electronic device. Accordingly, when the electronic device transmits the avatar to the external electronic device and displays the avatar through the external electronic device, it may take a long time to transmit an avatar file, to load data, and to process rendering.

Aspects of the disclosure are to address at least the above-mentioned problems and/or disadvantages and to provide at least the advantages described below. Accordingly, an aspect of the disclosure is to provide a method and an electronic device for identifying an external electronic device (e.g., a wearable device, a watch, and/or AR glasses), generating an avatar optimized for the identified external electronic device, and transmitting the optimized avatar to the external electronic device when generating the avatar.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a communication module, a camera module, a memory configured to store capability-related information about an external electronic device and information related to content, and a processor configured to be operatively connected to the communication module, the camera module, and the memory. The processor may generate at least one first content corresponding to a user using the camera module, may convert the at least one first content into at least one second content, based on the capability-related information about the external electronic device and the information related to the content, and may transmit the at least one second content to the external electronic device through the communication module.

In accordance with another aspect of the disclosure, a method is provided. The method includes generating at least one first content corresponding to a user using a camera module, converting the at least one first content into at least one second content, based on capability-related information about an external electronic device and information related to content, and transmitting the at least one second content to the external electronic device.

Advantageous Effects

According to various embodiments of the disclosure, when generating an avatar, an electronic device may identify a specification and a capability of an external electronic device (e.g., a wearable device, a watch, and/or AR glasses) and may generate an avatar optimized for the external electronic device, based on the specification and the capability. According to an embodiment, in displaying an avatar through an external device, the electronic device may generate an avatar optimized for the external device while maintaining a high quality according to actual feeling of a user and may transmit the avatar to the external device.

According to various embodiments, an electronic device may generate an avatar having an optimized size, capability, and quality, based on at least one external device and may share the generated avatar with the external device. In addition, various effects directly or indirectly identified through this document may be provided.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
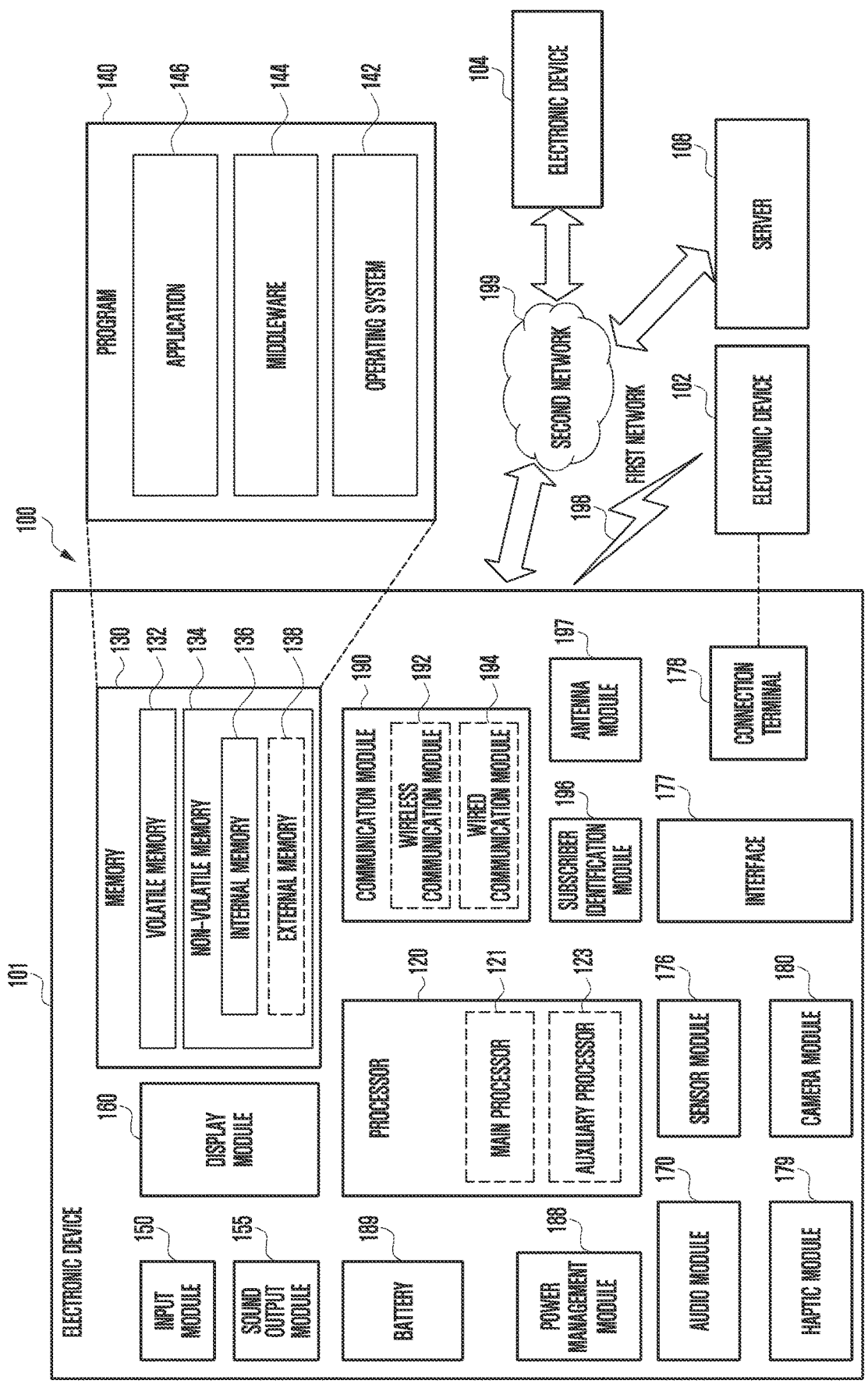
FIG. 1 is a block diagram of an electronic device in a network environment according to an embodiment of the disclosure.

FIG. 1 illustrates an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of electronic device 104 or a server 108 via a second network 199 (e.g., a long-range wireless communication network). The electronic device 101 may communicate with the electronic device 104 via the server 108. The electronic device 101 includes a processor 120, memory 130, an input module 150, an audio output module 155, a display module 160, an audio module 170, a sensor module 176, an interface 177, a connecting terminal 178, a haptic module 179, a camera module 180, a power management module 188, a battery 189, a communication module 190, a subscriber identity module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The audio output module 155 may output sound signals to the outside of the electronic device 101. The audio output module 155 may include, for example, a speaker or a receiver. The speaker may be used for general purposes, such as playing multimedia or playing record. The receiver may be used for receiving incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include a touch sensor adapted to detect a touch, or a pressure sensor adapted to measure the intensity of force incurred by the touch.

The audio module 170 may convert a sound into an electrical signal and vice versa. The audio module 170 may obtain the sound via the input module 150, or output the sound via the audio output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
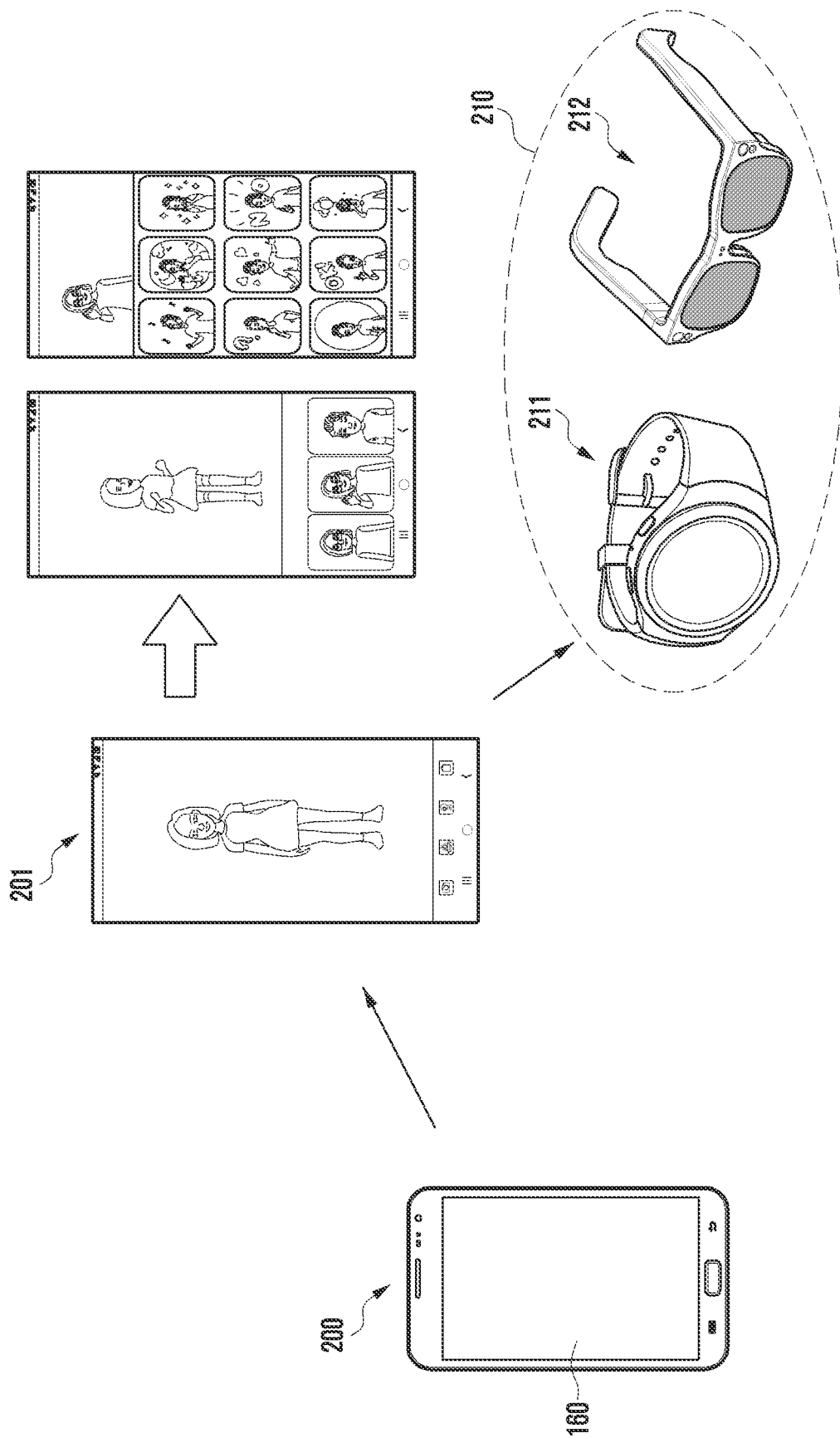
FIG. 2 illustrates an operation of generating an avatar and transmitting the avatar to an external device according to an embodiment of the disclosure.

FIG. 2 illustrates an operation of generating an avatar and transmitting the avatar to an external device (e.g., a wearable device) according to an embodiment of the disclosure.

According to various embodiments, an electronic device 200 (e.g., the electronic device 101 of FIG. 1) may store at least one program (e.g., the program 140 of FIG. 1) as software in a memory (e.g., the memory 130 of FIG. 1). For example, the at least one program 140 may include at least one application (e.g., the application 146 of FIG. 1). The application 146 may be defined as application software developed to perform a designated task, and may provide various functions to a user so that the user may efficiently perform the designated task. For example, the avatar application 201 is an application for generating an avatar of a user that uses the electronic device 200, and may generate a virtual character corresponding to the user. For example, the avatar may have an appearance similar to that of the user, and may include virtual content capable of expressing an emotion of the user. According to an embodiment, the electronic device 200 may generate an avatar with an optimized quality, based on a specifications and a capability of the electronic device 200, using the avatar application 201. For example, as the capability of the electronic device 200 improves, a higher-quality avatar may be configured. A high-quality avatar may be configured relatively more precisely than a low-quality avatar. A high-quality avatar may require a large data size, a high-level rendering processing capability (e.g., GPU specification), and a large memory capacity (e.g., memory size).

According to an embodiment, the quality of the avatar may be determined based on the specification and capability of the electronic device 200, and processing time may be determined according to the specification and capability of the electronic device 200. For example, an electronic device having a low specification and a low capability may take a relatively long time to process an avatar.

Referring to FIG. 2, an electronic device 200 may execute an avatar application 201 to generate an avatar, and may transmit the generated avatar to an external electronic device 210 (e.g., a wearable device, a watch 211, and/or AR glasses 212) so that the external electronic device 210 may utilize the avatar.

According to an embodiment, when transmitting the avatar to the external electronic device 210, the electronic device 200 may be affected by a state of communication with the external electronic device 210 and a specification and/or a capability of the external electronic device 210. For example, the specification and/or the capability of the external electronic device 210 may be relatively lower than the specification and/or the capability of the electronic device 200. For example, compared to the electronic device 200, the external electronic device 210 may be designed to include a relatively small internal space for disposing various components and to have a low resolution of a display. In the external electronic device 210, compared to the electronic device 200, components having a relatively low specification may be disposed to support the low resolution of the display.

According to an embodiment, the avatar generated by the electronic device 200 may be configured with a high capacity, and it may take a considerable time to transmit the avatar to the external electronic device 210. For example, the external electronic device 210 may take a considerable time for an operation of loading the avatar received from the electronic device 200 and displaying the avatar on the display. The external electronic device 210 configured with a relatively low specification than the electronic device 200 may take a considerable time to load the avatar.

According to an embodiment, the electronic device 200 may determine the quality of the avatar, based on preset configuration information, configuration information in the avatar application (e.g., a platform), and the specification and/or the capability of the electronic device 200.

Figure 3:
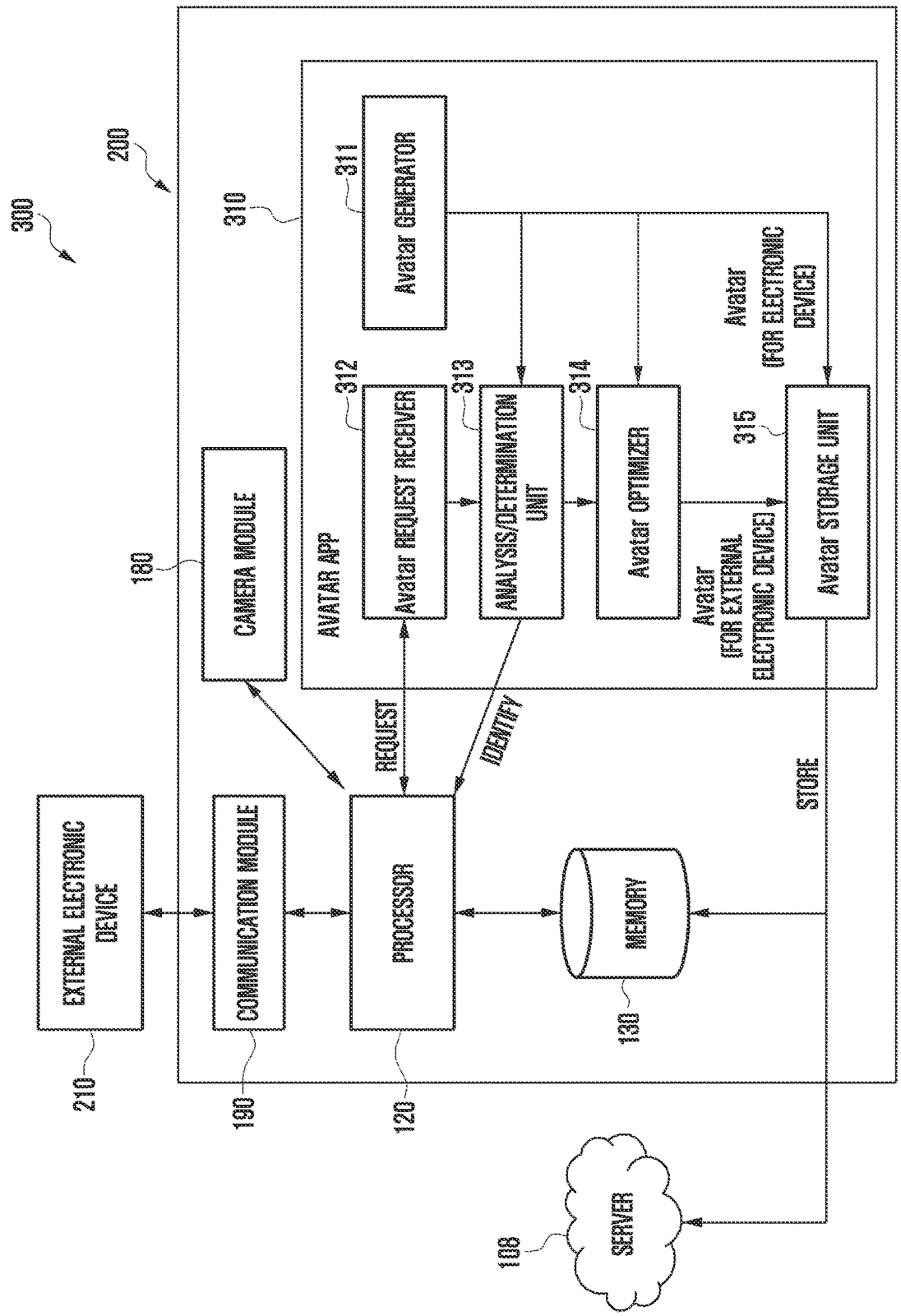
FIG. 3 is a block diagram of an electronic device according to an embodiment of the disclosure.

FIG. 3 is a block diagram of an electronic device according to an embodiment of the disclosure.

Referring to FIG. 3 depicting block diagram 300, an electronic device 200 (e.g., an electronic device 101 of FIG. 1) may include a processor (e.g., a processor 120 of FIG. 1), a memory (e.g., a memory 130 of FIG. 1), a camera module (e.g., a camera module 180 of FIG. 1), a communication module (e.g., a communication module 190 of FIG. 1), and/or an avatar application 310. The electronic device 200 may be operatively connected to an external electronic device 210 and a server (e.g., the server 108 of FIG. 1) through the communication module 190, and may transmit and receive data thereto and therefrom. The avatar application 310 may include various components (e.g., an avatar generator 311, an avatar request receiver 312, an analysis/determination unit 313, an avatar optimizer 314, and/or an avatar storage unit 315) for generating an avatar.

According to an embodiment, the processor 120 of the electronic device 200 may generate an avatar associated with a user, based on the avatar application 310. For example, the avatar may be virtual content to replace the user, and may be configured based on an appearance of the user. The avatar may be configured as a human-shaped icon reflecting a characteristic of the user, based on the user. The avatar may express an emotion of the user on behalf of the user. The electronic device 200 may capture an image associated with the user using the camera module (e.g., the camera module 180 of FIG. 1) in response to execution of the avatar application 310, and may configure at least one avatar, based on the captured image.

According to an embodiment, the processor 120 may execute the avatar application 310 in response to an instruction to request an avatar. The processor 120 may transmit the instruction to the avatar request receiver 312. The processor 120 may analyze and determine at least one information (e.g., specification and capability-related information about the external electronic device 210) for generating an avatar in the analysis/determination unit 313 of the avatar application 310. For example, when the electronic device 200 autonomously requests an avatar, the processor 120 may analyze a specification and a capability of the electronic device 200 to determine information to be reflected in the avatar. In another example, to use an avatar in the external electronic device 210, the electronic device 200 may request to generate the avatar, may analyze a specification and a capability of the external electronic device 210, and may determine information to be reflected in the avatar. The processor 120 may determine the optimized quality of the avatar, based on the information to be reflected in the avatar, in the avatar optimizer 314. For example, when the avatar is loaded and displayed in the external electronic device 210, the processor 120 may perform a process for optimizing the avatar through the avatar optimizer 314 to optimize the avatar to be displayed on the external electronic device 210. According to an embodiment, the processor 120 may generate a first avatar (e.g., an avatar optimized for the electronic device 200), based on the specification and the capability of the electronic device 200, through the avatar generator 311, and may store the first avatar in the avatar storage unit 315. According to an embodiment, the processor 120 may generate a second avatar (e.g., an avatar optimized for the external electronic device 210), based on the specification and the capability of the external electronic device 210, and may store the second avatar in the avatar storage unit 315. The avatar storage unit 315 may be at least partially included in the memory 130 of the electronic device 200. Referring to FIG. 3, the memory 130 and the avatar storage unit 315 are illustrated separately, but the disclosure is not limited thereto. The electronic device 200 may store the first avatar and the second avatar in a storage space of the server 108.

According to an embodiment, the processor 120 of the electronic device 200 may utilize the first avatar when displaying the avatar in the electronic device 200, and may transmit the second avatar to the external electronic device 210 when displaying the avatar in the external electronic device 210.

According to an embodiment, the electronic device 200 may be operatively connected to the external electronic device 210 through the communication module 190, and may obtain the specification and capability-related information about the external electronic device 210 from the external electronic device 210. According to an embodiment, when connected with the external electronic device 210, the electronic device 200 may obtain plug-in information about the external electronic device 210, and may store the obtained plug-in information in the memory 130. For example, the processor 120 of the electronic device 200 may predict or analyze the specification and capability-related information about the external electronic device 210, based on the plug-in information stored in the memory 130. When generating an avatar to be transmitted to the external electronic device 210, the processor 120 may identify whether the plug-in information about the external electronic device 210 is stored in the memory 130, and may generate an optimized avatar corresponding to the external electronic device 210, based on the plug-in information.

According to an embodiment, when generating the optimized avatar for the external electronic device 210, the processor 120 may generate the avatar, based on the specification and the capability of the external electronic device 210. For example, the processor 120 may determine a texture size for the optimized avatar for the external electronic device 210 and/or a texture format for the optimized avatar for the external electronic device 210. For example, the texture size for the avatar may be differently determined depending on each texture type (e.g., a physically based rendering (PBR) material type) or may be differently determined depending on each part (e.g., a head or a body) of the avatar.

According to various embodiments, an electronic device 101 or 200 may include a communication module 190, a camera module 180, a memory 130 configured to store capability-related information about an external electronic device 210 and information related to content, and a processor 120 configured to be operatively connected to the communication module 190, the camera module 180, and the memory 130. The processor 120 may generate at least one first content corresponding to a user using the camera module 180, may convert the at least one first content into at least one second content, based on the capability-related information about the external electronic device 210 and the information related to the content, and may transmit the at least one second content to the external electronic device 210 through the communication module 190.

According to an embodiment, the first content and the second content may include at least one of an avatar replacing the user, virtual content, a virtual character, and a virtual icon, which are generated based on an image captured using the camera module 180.

According to an embodiment, the capability-related information about the external electronic device 210 may include specification information and capability information about at least one component forming the external electronic device 210.

According to an embodiment, the information related to the content may include texture information about the content, texture size information, texture format information, and/or information about a part forming the content.

According to an embodiment, the texture information about the content may include at least one of albedo, normal, metallic, and/or roughness, which represent a texture of the content, and optimized texture size information may be determined according to the texture information.

According to an embodiment, the texture format information about the content may include a compression method for minimizing quality deterioration and/or a lossy compression method in which quality deterioration occurs, in an operation of compressing the content to be converted into a file format.

According to an embodiment, the information about the part forming the content may include at least one of a head part, a body part, and/or a bottom part.

According to an embodiment, the processor 120 may individually convert the first content in response to each body part forming the first content, based on the capability-related information about the external electronic device 210 and the information related to the content, and may generate the second content by integrating each of the converted body part.

According to an embodiment, the processor 120 may generate third content corresponding to the external electronic device 210, based on the capability-related information about the external electronic device 210 and the information related to the content included in a request signal, in response to the request signal from the external electronic device 210, and may transmit the third content to the external electronic device 210 through the communication module 190.

According to an embodiment, the processor 120 may identify whether the third content is stored in the memory 130 in response to the request signal from the external electronic device 210, and may transmit the third content stored in the memory 130 to the external electronic device 210 when the third content is stored in the memory 130.

According to an embodiment, the external electronic device 210 may include at least one of a wearable watch, AR glasses, a smartphone, a virtual reality (VR) device, and a personal computer (PC).

Figure 4:
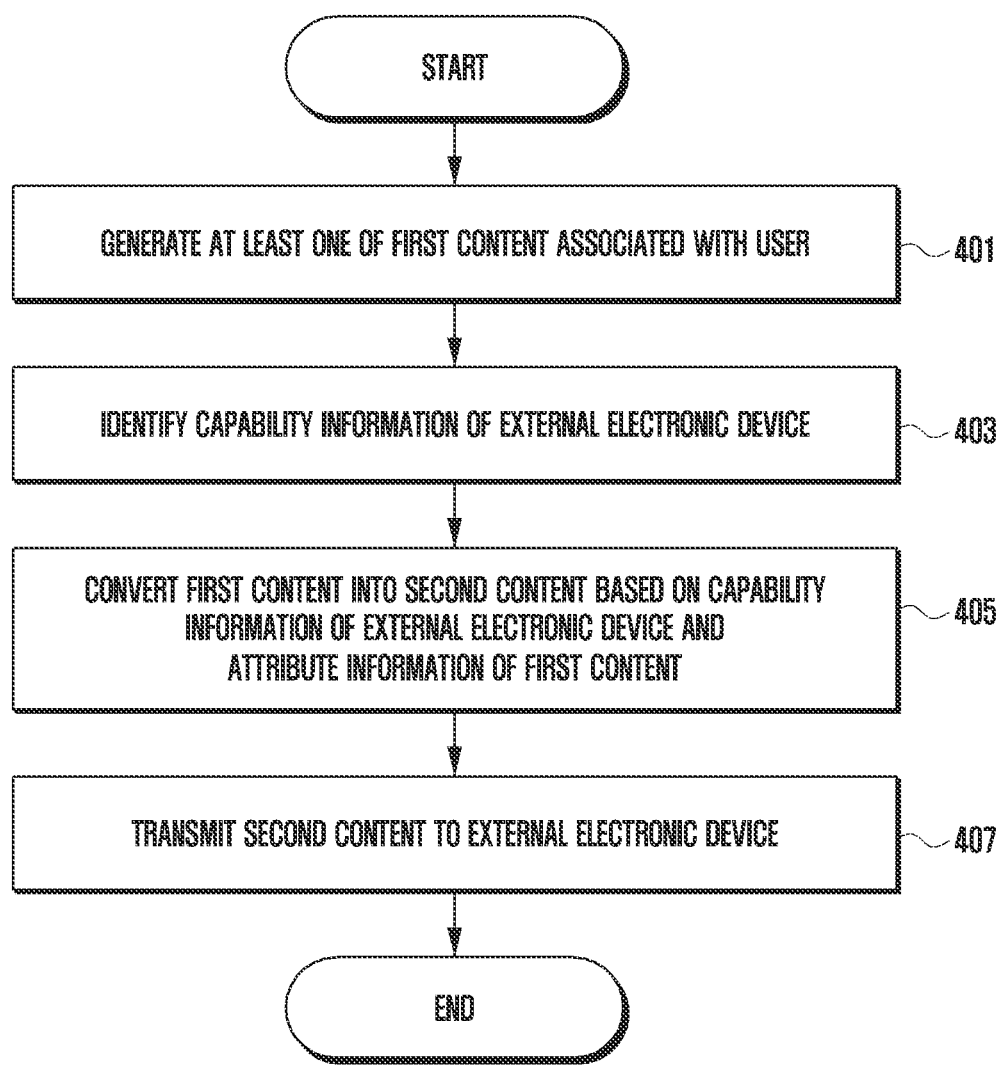
FIG. 4 is a flowchart illustrating a method for generating content, based on a capability of an external device according to an embodiment of the disclosure.

FIG. 4 is a flowchart illustrating a method for generating content, based on a capability of an external device according to an embodiment of the disclosure.

According to various embodiments, an electronic device (e.g., the electronic device 101 of FIG. 1 or the electronic device 200 of FIG. 2) may generate first content (e.g., an avatar) associated with a user, based on an avatar application (e.g., the avatar application 310 of FIG. 3). For example, a processor (e.g., the processor 120 of FIG. 1) of the electronic device 101 may capture an image corresponding to the user using a camera module (e.g., the camera module 180 of FIG. 1), and may generate the first content, based on the image. The processor 120 may determine the quality of the first content, based on a specification and a capability of the electronic device 101. For example, the avatar (e.g., the first content) may be virtual content (e.g., a virtual character) to replace the user, and may be configured based on an appearance of the user. The avatar may express an emotion of the user on behalf of the user. The electronic device 101 may use the avatar for communication with an external electronic device (e.g., the electronic devices 102 or 104 of FIG. 1 or the external electronic device 210 of FIG. 2), and may convey exact intention to a counterpart (or user) using the external electronic device 210. According to an embodiment, the electronic device 101 may identify a specification and a capability of the external electronic device 210 to which the avatar is transmitted, and may generate second content, based on the specification and the capability of the external electronic device 210. For example, the processor 120 may at least partially convert the first content, thereby generating the second content. According to an embodiment, the electronic device 101 may convert the first content (e.g., the avatar) into the second content, based on the specification and the capability of the external electronic device 210, so that the first content may be quickly received and displayed on the external electronic device 210. For example, the second content may include an optimized avatar corresponding to the specification and the capability of the external electronic device 210.

In operation 401, the processor 120 may generate at least one first content associated with the user. For example, the first content may include virtual content (e.g., a virtual character or an avatar) to replace the user. The processor 120 may activate the camera module 180 to capture an image including the user, and may generate the first content corresponding to the user, based on the image. According to an embodiment, the processor 120 may generate the first content optimized for the electronic device 101, based on the specification and the capability of the electronic device 101. For example, the quality of the first content may be determined based on the specification and the capability of the electronic device 101. According to an embodiment, the processor 120 may determine a texture size for the first content (e.g., the avatar) and/or a texture format for the first content (e.g., the avatar), based on the specification and the capability of the electronic device 101. According to an embodiment, the processor 120 may provide the user with the first content optimized for the electronic device 101.

In operation 403, the processor 120 may identify the external electronic device 210 for using the first content. For example, when transmitting a message to the external electronic device 210, the processor 120 may include the first content in the message. The electronic device 101 may more accurately convey the user's emotion and intention using the first content. The processor 120 may identify the specification and the capability of the external electronic device 210 that is currently being operatively connected and/or the external electronic device 210 that has been previously connected. According to an embodiment, the processor 120 may configure optimized content (e.g., an avatar) corresponding to the external electronic device 210 by identifying the specification and the capability of the external electronic device 210. According to an embodiment, the processor 120 may determine a texture size for the second content (e.g., the avatar) and/or a texture format for the second content (e.g., the avatar), based on the specification and the capability of the external electronic device 210.

In operation 405, the processor 120 may convert the first content into the second content, based on capability information (e.g., capability-related information or specification-related information) about the external electronic device 210 and attribute information about the first content. For example, the processor 120 may convert the first content generated to be optimized according to the capability of the electronic device 101 into the second content optimized according to the capability of the external electronic device 210. For example, when the electronic device 101 has a more remarkable capability than the external electronic device 210 (e.g., a wearable device), the processor 120 may perform an operation of downscaling the first content may convert the first content into the second content.

In operation 407, the processor 120 may transmit the second content to the external electronic device 210. According to an embodiment, since the second content is optimized based on the capability information about the external electronic device 210, the external electronic device 210 may provide the second content to the user optimized for the external electronic device 210.

According to an embodiment, the electronic device 101 may configure the avatar corresponding to the capability of the external electronic device 210 so that the avatar configured with an optimal quality may be provided even in a situation where the avatar is provided to the user through the external electronic device 210. According to an embodiment, when the avatar is displayed on the electronic device 101, the electronic device 101 may display the first content (e.g., a first avatar) optimized based on the electronic device 101. When the avatar is displayed on the external electronic device 210, the electronic device 101 may transmit the second content (e.g., a second avatar) optimized based on the external electronic device 210 to the external electronic device 210, and may display the second content through the external electronic device 210.

Figure 5:
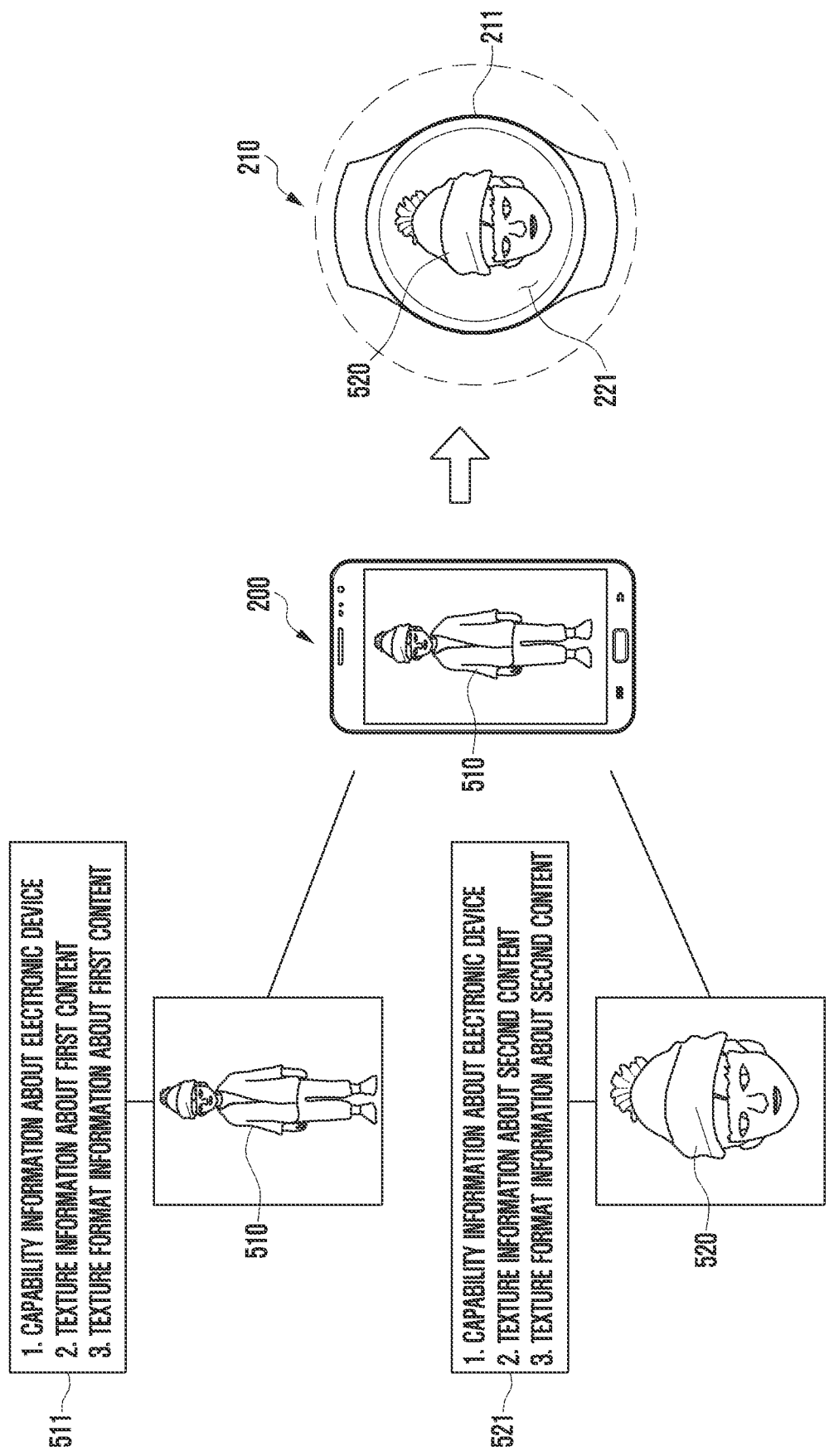
FIG. 5 illustrates an operation of an electronic device generating content, based on a capability of an external device, and transmitting the content to the external device according to an embodiment of the disclosure.

FIG. 5 illustrates an operation of an electronic device generating content, based on a capability of an external device, and transmitting the content to the external device according to an embodiment of the disclosure.

According to various embodiments, in a state of being operatively connected to an external electronic device (e.g., the electronic device 102 or 104 of FIG. 1 or the external electronic device 210 of FIG. 2), the electronic device (e.g., the electronic device 101 of FIG. 1 or the electronic device 200 of FIG. 2) may share data with the external electronic device 210. The electronic device 101 may execute an avatar application (e.g., the avatar application 310 of FIG. 3) to generate first content 510 (e.g., an avatar) associated with a user. For example, the first content 510 may include a first avatar optimized based on a specification and a capability of the electronic device 101. The electronic device 101 may convert the first content 510 into second content 520, and may transmit the second content 520 to the external electronic device 210. For example, the second content 520 may include a second avatar optimized based on a specification and a capability of the external electronic device 210.

According to an embodiment, the electronic device 101 may identify the specification and/or the capability of the external electronic device 210, may generate an avatar optimized based on the external electronic device 210, and may transmit the avatar to the external electronic device 210. According to an embodiment, when the electronic device 101 is used, the first avatar (e.g., first content 510) optimized corresponding to the electronic device 101 may be displayed on a display (e.g., the display module 160 of FIG. 1) of the electronic device 101. When the external electronic device 210 is used, the second avatar (e.g., second content 520) optimized corresponding to the external electronic device 210 may be displayed on a display 221 of the external electronic device 210.

Referring to FIG. 5, a first content 510 may be configured based on first avatar-related information 511 (e.g., capability information about the electronic device 101, texture information about the first content 510, and/or texture format information about the first content 510).

For example, the capability information about the electronic device 101 may include a specification of the processor 120, a capacity of the memory 130, and/or a resolution supportable by a display module (e.g., the display module of FIG. 1). The capability information about the electronic device 101 may include detailed specification information about at least one component forming the electronic device 101 and/or capability information about a processing ability to configure the avatar (e.g., the first content 510).

For example, the texture information about the first content 510 may include feel information and/or size information about the first avatar. The texture information may include a physically based rendering (PBR) material type (e.g., albedo, normal, metallic, or roughness). For example, when rendering the first content 510 (e.g., the first avatar), the processor 120 may perform the rendering using a Phong shading method or a physically based shading (PBS) method. When performing the rendering based on the PBS method, the processor 120 may determine a size for texture forming the first content 510 according to a texture type (e.g., albedo, normal, metallic, or roughness). According to an embodiment, the processor 120 may configure a different texture type or a different texture size according to a part (e.g., a head, a body, or a bottom) of the first content 510. For example, the first content 510 may be configured as the entire part (e.g., the head, the body, and the bottom) forming the avatar.

For example, the texture format information about the first content 510 may include information about the format of the first content 510 in an operation in which the processor 120 compresses the first content 510 to be converted into a file format. The texture format information may be configured such that each part of the first content 510 has a different format.

According to an embodiment, the electronic device 101 may configure the first content 510, based on the first avatar-related information 511 (e.g., the capability information about the electronic device 101, the texture information about the first content 510, and/or the texture format information about the first content 510).

Referring to FIG. 5, a second content 520 may be configured based on second avatar-related information 521 (e.g., capability information about the external electronic device 210, texture information about the second content 520, and/or texture format information about the second content 520).

For example, the capability information about the external electronic device 210 may include a specification of a processor, a capacity of a memory, and/or a resolution supportable by a display module corresponding to the external electronic device 210. The capability information about the external electronic device 210 may include detailed specification information about at least one component forming the external electronic device 210 and/or capability information about a processing ability to configure the avatar (e.g., the second content 520). According to an embodiment, when operatively connected to the external electronic device 210, the electronic device 200 may obtain the capability information about the external electronic device 210 and may store the capability information in the memory 130.

For example, the texture information about the second content 520 may include feel information and/or size information about the second avatar. When rendering the second content 520 (e.g., the second avatar), the processor 120 may perform the rendering using the Phong shading method or the physically based shading (PBS) method. When performing the rendering based on the PBS method, the processor 120 may determine a size for texture forming the second content 520 according to a texture type (e.g., albedo, normal, metallic, or roughness). According to an embodiment, the processor 120 may configure a different texture type or a different texture size according to a part (e.g., a head, a body, or a bottom) of the second content 520. For example, the second content 520 may be configured as the entire part (e.g., the head, the body, and the bottom) forming the avatar. The second content 520 of FIG. 5 is configured as the head of the avatar, but is not limited thereto.

For example, the texture format information about the second content 520 may include information about the format (e.g., a portable network graphic (PNG) format that minimizes quality deterioration or a JPG format as a lossy compression technique in which quality deterioration at least partially occurs) of the second content 520 in an operation in which the processor 120 compresses the second content 520 to be converted into a file format. The texture format information may be configured such that each part of the second content 520 has a different format.

According to an embodiment, the electronic device 200 may configure the second content 520, based on the second avatar-related information 521 (e.g., the capability information about the external electronic device 210, the texture information about the second content 520, and/or the texture format information about the second content 520). According to an embodiment, the electronic device 200 may first generate the first content 510 and may then convert the first content 510 to the second content 520, based on the second avatar-related information 521.

According to an embodiment, the first content 510 may be displayed with an optimized quality through the display module 160 of the electronic device 200. For example, the first content 510 may include an avatar optimized according to the resolution supported by the display module 160. The second content 520 may be displayed with an optimized quality through the display 221 of the external electronic device 210 (e.g., a watch 211). For example, the second content 520 may include an avatar optimized according to the resolution supported by the display 221 of the watch 211.

Figure 6:
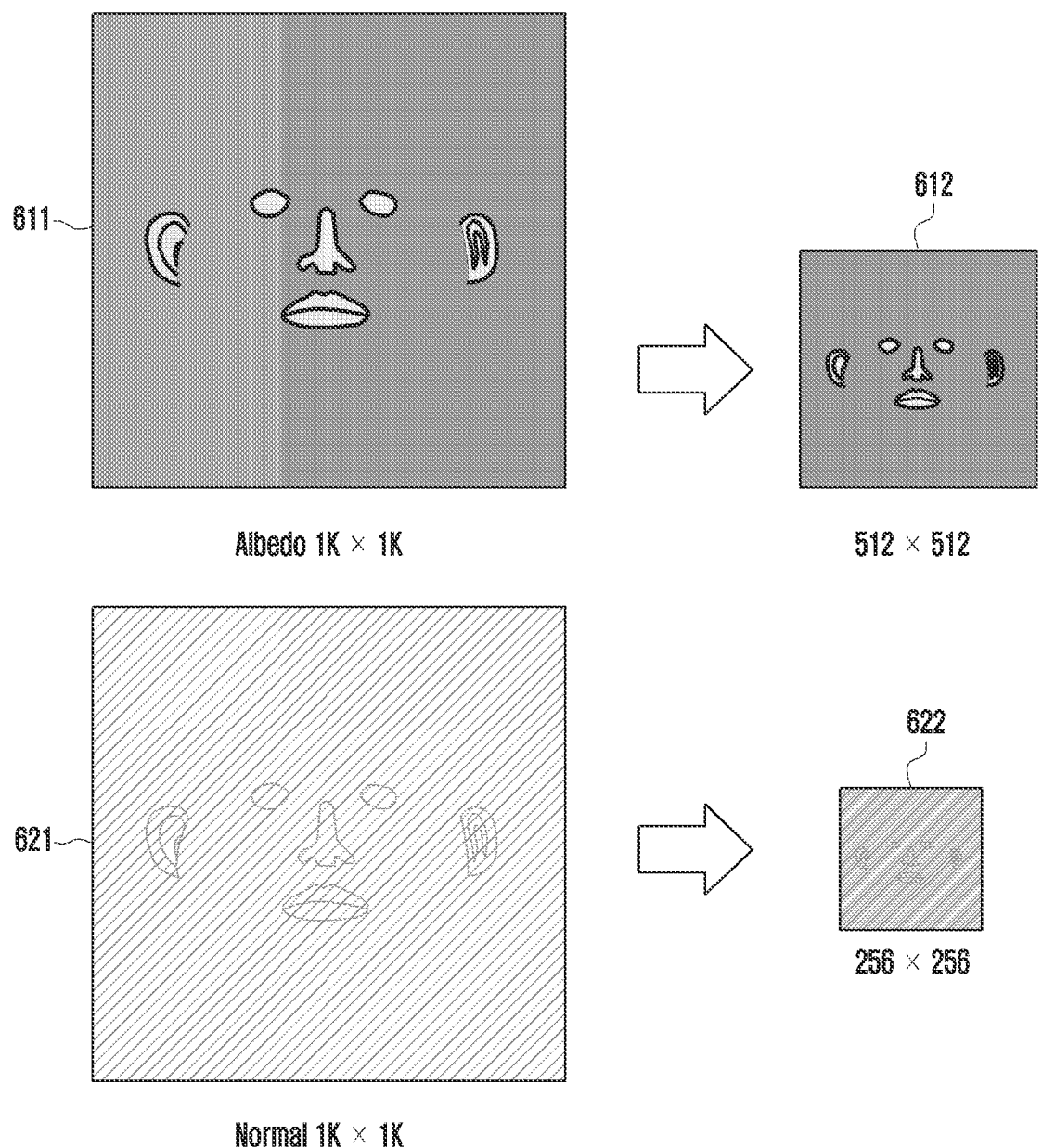
FIG. 6 illustrates an operation of adjusting the resolution of an avatar, based on the texture type of the avatar according to an embodiment of the disclosure.

FIG. 6 illustrates an operation of adjusting the resolution of an avatar, based on the texture type of the avatar according to an embodiment of the disclosure.

According to an embodiment, in generating an avatar, an electronic device (e.g., the electronic device 101 of FIG. 1 or the electronic device 200 of FIG. 2) may determine a texture for the avatar. For example, the texture for the avatar may include a physically based rendering (PBR) material type (e.g., albedo, normal, metallic, or roughness).

For example, since the electronic device 101 and an external electronic device (e.g., the external electronic device 210 of FIG. 2) have different specifications and capabilities, a different size of an optimized avatar may be configured depending on a texture type. For example, the better a capability and a specification of the electronic device 101 are, the larger the size of an avatar optimized according to a texture type may be configured.

Table 1 is a table showing avatar sizes configured for the electronic device 101 and the external electronic device 210 according to texture types.

TABLE 1

| Texture type | For electronic device | For external electronic device (e.g., watch) |
|---|---|---|
| Albedo | 1024*1024 | 512*512 |
| Normal | 1024*1024 | 256*256 |
| Roughness | 1024*1024 | 256*256 |
| Metallic | 1024*1024 | 256*256 |

Textures for the avatar may be divided into four types: albedo, normal, metallic, and roughness. Albedo may be a texture corresponding to a raw color level, and normal may be a texture corresponding to a normal map level of a 3d mesh surface. Metallic and roughness may be textures corresponding to a metal level and a roughness level of a surface, respectively.

Referring to Table 1, the electronic device 101 may configure a first avatar in a size of 1024*1024 in response to all four textures. The first avatar may be an avatar configured with an optimized quality in the electronic device 101. The electronic device 101 may convert (e.g., upscale or downscale) the first avatar into a second avatar in order to transmit the avatar to the external electronic device 210 (e.g., a wearable watch). For example, when the external electronic device 210 has a specification and a capability lower than those of the electronic device 101, the electronic device 101 may downscale the first avatar to be converted into the second avatar.

Referring to FIG. 6, when a first avatar is converted into a second avatar, based on an albedo texture, an electronic device 101 may downscale the first avatar 611 configured in a 1024*1024 size into the second avatar 612 with a 512*512 size. In another example, when the first avatar is converted into the second avatar, based on a normal texture, the electronic device 101 may downscale the first avatar 621 configured in a 1024*1024 size into the second avatar 622 with a 256*256 size.

According to an embodiment, the electronic device 101 may identify a texture type (e.g., albedo, normal, metallic, or roughness) for the avatar, and may convert (e.g., upscale or downscale) the avatar to have a different size for each texture type.

According to an embodiment, the electronic device 101 may apply a different texture type to each part (e.g., a head, a body, or a bottom) forming the avatar. Parts forming the avatar are not limited to the head, the body, and the bottom, and may be classified variously according to a configuration. According to an embodiment, when configuring the avatar, the electronic device 101 may configure the avatar such that each part forming the avatar has a different quality.

Table 2 is a table showing different ratios for individual parts.

TABLE 2

| Avatar part | Texture type | Electronic device | External electronic device |
|---|---|---|---|
| Head/hair/ (Glasses or earring) top/headwear | Albedo Normal Metallic Roughness | 1024*1024 1024*1024 | 512*512 256*256 |
| Body | Albedo Normal Metallic Roughness | 1024*1024 1024*1024 | 256*256 128*128 |
| Bottom/shoes | Albedo Normal Metallic Roughness | 1024*1024 1024*1024 | 256*256 128*128 |

Referring to Table 2, the electronic device 101 may optimize the entire part (e.g., the head, the body, and the bottom) of the first avatar, based on a 1024*1024 ratio. The first avatar may be an avatar optimized for the electronic device 101 regardless of a part and a texture type. The electronic device 101 may convert the first avatar into the second avatar so that an avatar optimized for the external electronic device 210 is displayed through the external electronic device 210.

Referring to Table 2, in a texture type of albedo, the electronic device 101 may downscale the head of the first avatar with a 1024*1024 ratio into a head of the second avatar with a 512*512 ratio. In a texture type of normal, the electronic device 101 may downscale the body of the first avatar with a 1024*1024 ratio into a body of the second avatar with a 128*128 ratio. For example, the external electronic device 210 corresponds to a wearable watch and has a relatively small size (e.g., resolution) of a display, thus being utilized focusing on the head of the second avatar. When converting the second avatar for the external electronic device 210, the electronic device 101 may convert the second avatar, focusing on the head. According to an embodiment, the electronic device 101 may apply different types of textures or may apply different resolutions for the respective parts (e.g., the head, the body, and the bottom) forming the avatar.

According to an embodiment, after configuring the avatar, the electronic device 101 may apply a different format by each part of the avatar or at least partially in an operation of compressing the avatar to be converted into a file format. For example, when generating the first avatar optimized for the electronic device 101, the electronic device 101 may use a texture in a PNG format. When generating and/or converting the second avatar optimized for the external electronic device 210, the electronic device 101 may use a texture in a lossy compression format, such as JPG. The external electronic device 210 may include a wearable watch, and may display the avatar in a relatively small size. According to an embodiment, even though the texture in the lossy compression format is used due to the small size of the avatar, it may be difficult for a user to visually recognize quality deterioration.

According to an embodiment, the electronic device 101 may identify a texture type (e.g., albedo, normal, metallic, or roughness) and may apply a different format for each texture type. Table 3 is a table showing different formats applied by each part of the avatar or according to the texture type.

TABLE 3

| Texture | Electronic device | External electronic device |
|---|---|---|
| Part requiring alpha blending (glasses, eyelash, socks, and see-through clothes) | All textures: PNG format | Albedo/normal: PNG format Metallic/roughness: JPG format |
| Part not requiring alpha blending | All textures: PNG format | Textures other than Normal: JPG format Normal: PNG format |
| Normal texture | All textures: PNG format | All textures: PNG format |
| Total capacity | 8.14 MB | 6.85 MB |

Referring to Table 3, the electronic device 101 may optimize the entire part (e.g., the head, the body, and the bottom) of the first avatar, based on the PNG format. The first avatar may be an avatar optimized for the electronic device 101 regardless of a part and a texture type. The electronic device 101 may convert the first avatar into the second avatar so that the avatar optimized for the external electronic device 210 is displayed through the external electronic device 210.

Referring to Table 3, in an operation of converting the first avatar into the second avatar, when a part requiring alpha blending (e.g., a part requiring precise rendering) is an albedo/normal texture, the electronic device 101 may perform compression in the PNG format, and when the part requiring alpha blending is a metallic/roughness texture, the electronic device 101 may perform lossy compression in the JPG format. The electronic device 101 may perform compression in the PNG format only when a part not requiring alpha blending is a normal texture. In albedo/metallic/roughness textures other than the normal texture, the electronic device 101 may perform lossy compression in the JPG format. Referring to Table 3, since a rendering error is visually identified when lossy compression is performed on the normal texture, the electronic device 101 may perform compression in the PNG format on the normal texture.

Referring to Table 3, the electronic device 101 may configured the first avatar with a capacity of about 8.14 MB, and may configure the second avatar with a capacity of about 6.85 MB. According to an embodiment, the electronic device 101 may apply a different method for configuring an optimized avatar, based on the specification and the capability of the electronic device 101.

Figure 7A:
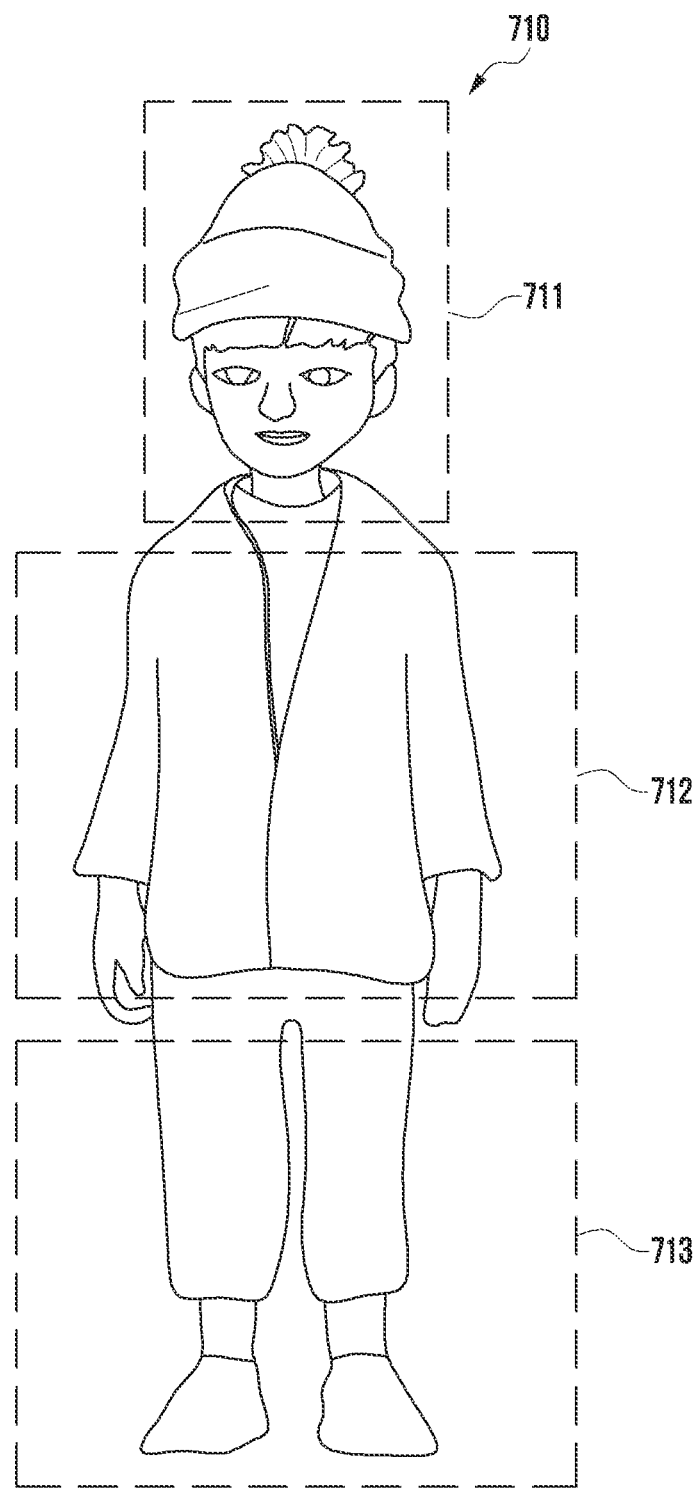
FIG. 7A illustrates an operation of generating an avatar, based on a capability of an external electronic device according to an embodiment of the disclosure.

FIG. 7A illustrates an operation of generating an avatar, based on a capability of an external electronic device according to an embodiment of the disclosure.

Referring to FIG. 7A, an electronic device (e.g., an electronic device 101 of FIG. 1 or an electronic device 200 of FIG. 2) may execute an avatar application (e.g., an avatar application 310 of FIG. 3), and may generate first content 710 (e.g., a first avatar) associated with a user, based on an avatar application 310. For example, a processor (e.g., the processor 120 of FIG. 1) of the electronic device 101 may capture an image corresponding to the user using a camera module (e.g., the camera module 180 of FIG. 1), and may generate the first content 710, based on the image. The processor 120 may determine a quality for the first content 710, based on a specification and a capability of the electronic device 101.

Referring to FIG. 7A, a processor 120 may classify a first content 710 by at least one part (e.g., a head 711, a body 712, and a bottom 713). According to an embodiment, the processor 120 may configure a different texture type (e.g., albedo, normal, metallic, or roughness) for each part. According to another embodiment, the processor 120 may configure a different resolution for each part. According to another embodiment, the processor 120 may apply a different texture format (e.g., a PNG format or a JPG format) to each part.

Figure 7B:
FIG. 7B illustrates an operation of generating an avatar, based on a head part of the avatar according to an embodiment of the disclosure.
Figure 7C:
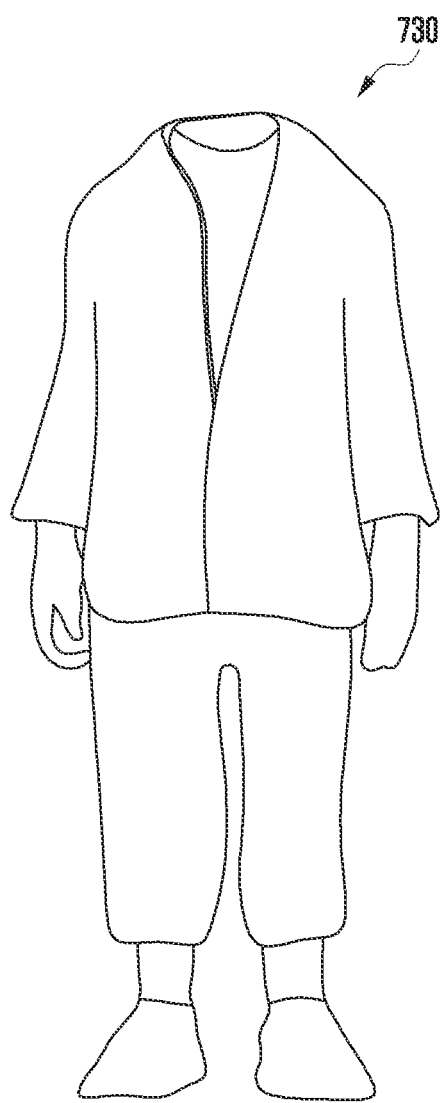
FIG. 7C illustrates an operation of generating an avatar, based on a body part of the avatar according to an embodiment of the disclosure.

FIG. 7B illustrates an operation of generating an avatar, based on a head part of an avatar according to an embodiment of the disclosure. FIG. 7C illustrates an operation of generating an avatar, based on a body part of the avatar according to an embodiment of the disclosure.

Referring to FIG. 7B, a processor 120 of an electronic device 101 may configure an avatar 720 (e.g., a head avatar) including only a head. For example, when providing the avatar to the external electronic device 210, the electronic device 101 may configure the avatar, based on a specification and a capability of an external electronic device 210. For example, when the external electronic device 210 is a wearable watch, since the size of a screen on which the avatar is displayed is small, the electronic device 101 may configure the avatar 720 including only the head. Referring to FIG. 7C, a processor 120 of an electronic device 101 may configure an avatar 730 (e.g., a body avatar) including only a body. For example, when providing the avatar to the external electronic device 210, the electronic device 101 may configure the avatar, based on the specification and the capability of the external electronic device 210.

According to an embodiment, the electronic device 101 may determine a texture type, a resolution, and/or a texture format for each body part (e.g., the head avatar 720 and the body avatar 730), based on the specification and the capability of the external electronic device 210, and may configure an avatar according to the determination.

Figure 7D:
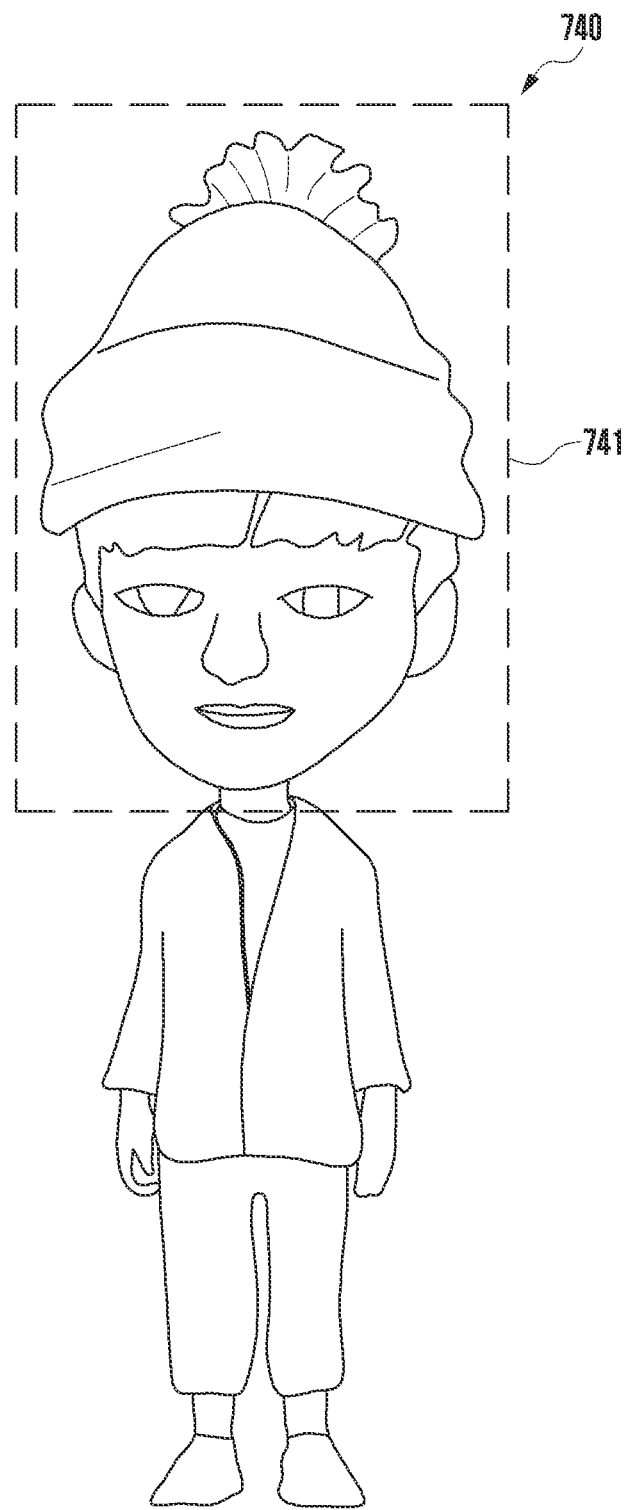
FIG. 7D illustrates an operation of generating an avatar in which a head part is greater than a different part according to an embodiment of the disclosure.
Figure 7E:
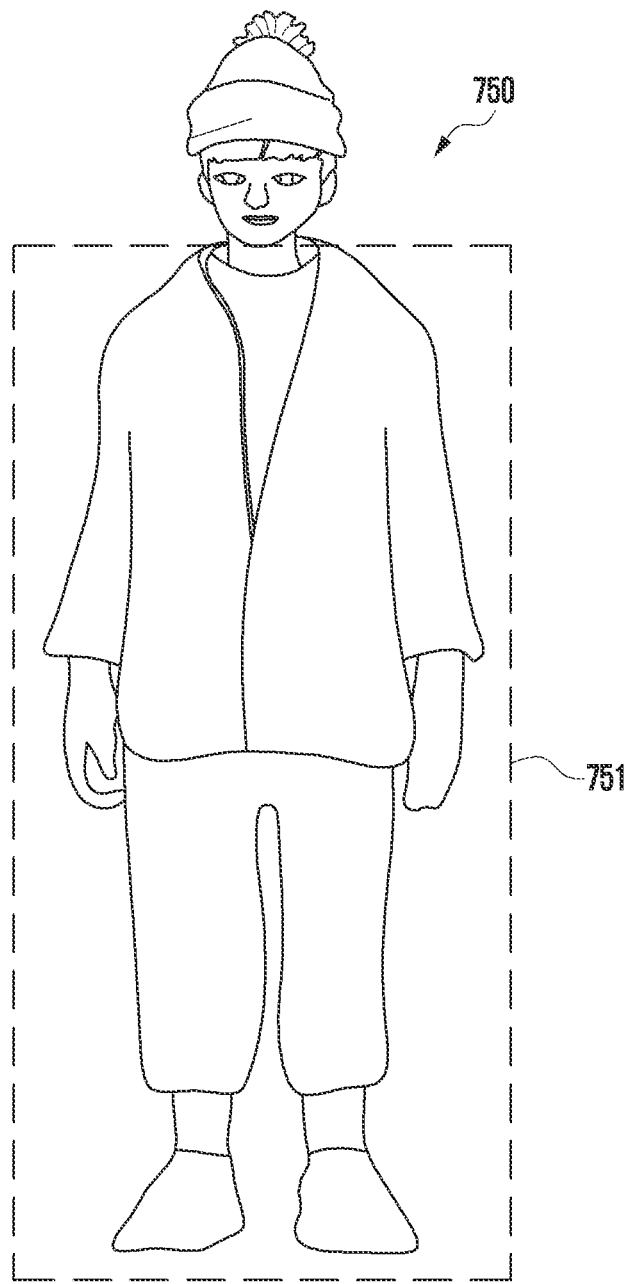
FIG. 7E illustrates an operation of generating an avatar in which a body part is greater than a different part according to an embodiment of the disclosure.

FIG. 7D illustrates an operation of generating an avatar 740 in which a head part 741 is greater than a different part according to an embodiment of the disclosure. FIG. 7E illustrates an operation of generating an avatar 750 in which a body part 751 is greater than a different part according to an embodiment of the disclosure.

According to an embodiment, the processor 120 of the electronic device 101 may configure a part (e.g., a head and a body) among body parts to be larger than a different part. The processor 120 may configure a texture type, a texture size, and/or texture format information for an enlarged body part to be different from those for a different body part.

Figure 7F:
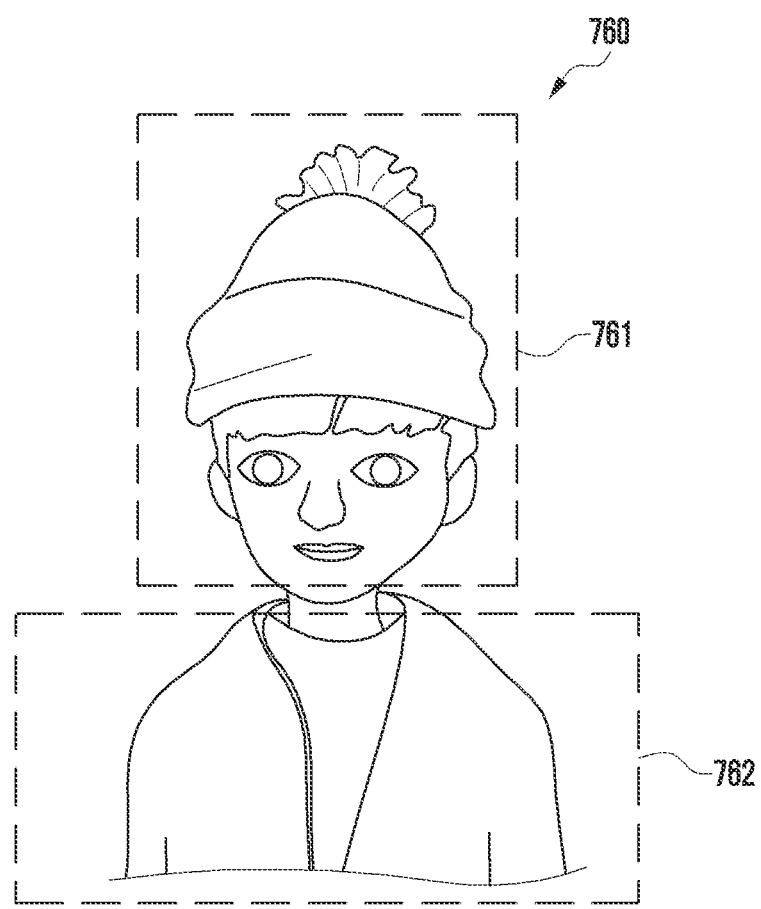
FIG. 7F illustrates an operation of generating an avatar, based on a portion of a head part and a body part of the avatar according to an embodiment of the disclosure.

FIG. 7F illustrates an operation of generating an avatar, based on a portion of a head part and a body part of the avatar according to an embodiment of the disclosure.

According to an embodiment, the processor 120 of the electronic device 101 may generate an avatar 760 configured only with a head part 761 and a portion 762 of a body among body parts, based on avatar-related information (e.g., specification and capability information about an electronic device to use the avatar, texture information about the avatar, and/or texture format information about the avatar). According to an embodiment, the processor 120 may individually determine a texture type, a texture size, and/or texture format information in response to at least one of the body parts of the avatar.

Figure 8:
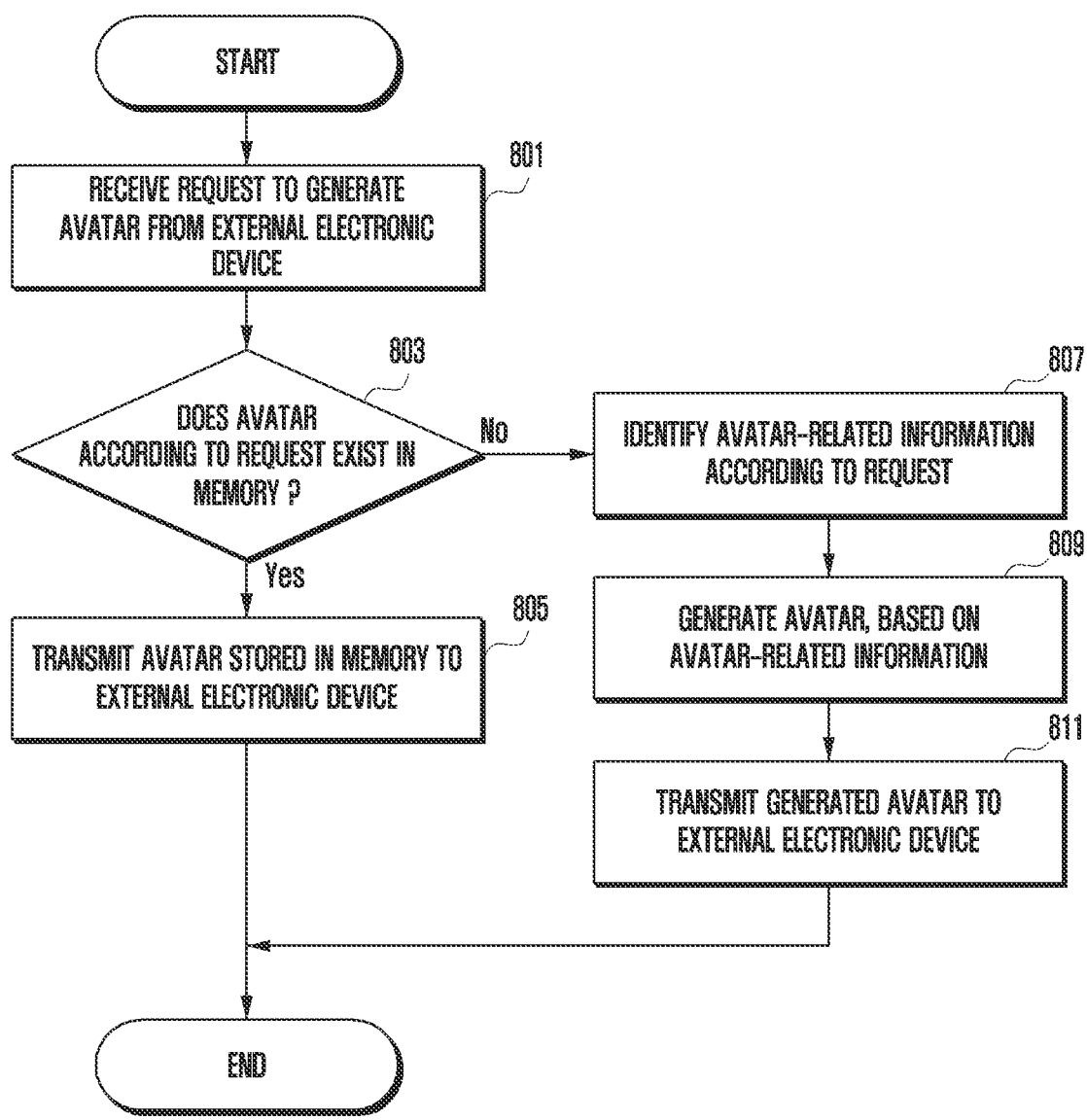
FIG. 8 is a flowchart illustrating a method for generating an avatar in response to a request from an external electronic device according to an embodiment of the disclosure.

FIG. 8 is a flowchart illustrating a method of generating an avatar in response to a request from an external electronic device according to various embodiments of the disclosure.

According to various embodiments, an electronic device (e.g., the electronic device 101 of FIG. 1 or the electronic device 200 of FIG. 2) may generate first content (e.g., an avatar) associated with a user, based on an avatar application (e.g., the avatar application 310 of FIG. 3). For example, a processor (e.g., the processor 120 of FIG. 1) of the electronic device 101 may capture an image corresponding to the user using a camera module (e.g., the camera module 180 of FIG. 1), and may generate the first content, based on the image. The processor 120 may determine a quality for the first content, based on a specification and a capability of the electronic device 101. The processor 120 may store the generated first content in a memory (e.g., the memory 130 of FIG. 1).

According to an embodiment, the electronic device 101 may receive an avatar generation request from an external electronic device (e.g., the electronic device 102 or 104 of FIG. 1, or the external electronic device 210 of FIG. 2), and may generate second content (e.g., an avatar) in response to the request. For example, an avatar generation request signal may include at least one of the type of the external electronic device 210, a specification of the external electronic device 210, capability information about the external electronic device 210, and/or avatar-related information (e.g., a texture type for an avatar, a texture size (resolution) for the avatar, and/or a body part of the avatar). The external electronic device 210 may request whether to generate an avatar by giving priority to capability or to generate an avatar by giving priority to quality. The electronic device 101 may generate a new avatar, based on the signal received from the external electronic device 210, or may generate the second content by converting the first content stored in the memory 130. According to an embodiment, the electronic device 101 may generate an avatar in response to the avatar generation request signal received from the external electronic device 210, and may transmit the avatar to the external electronic device 210.

In operation 801, the processor 120 may receive a request to generate an avatar from the external electronic device 210. For example, the electronic device 101 is in a state of being operatively connected to the external electronic device 210 and may share data with the external electronic device 210. The external electronic device 210 may transmit a request signal for generating an avatar including avatar-related information to the electronic device 101. Table 4 is a table showing the avatar-related information included in the request signal.

TABLE 4

| Avatar-related information | Content |
| --- | --- |
| Package name (essential) | 1. Package name of application generating request signal |
| Type of external electronic device (optional) | 1. Wearable watch<br>2. AR glass<br>3. Phone<br>4. VR<br>5. PC |

TABLE 4-continued

| Avatar-related information | Content |
| --- | --- |
| Display size (optional) | X*Y (e.g., 1024*1024, 512*512, 128*128) |
| Upscale/downscale (optional) | 1. Downscale<br>2. Upscale |
| Blend shape (optional) | Include/exclude |
| Body part (optional) | 1. Head + body<br>2. Head only<br>3. Body only<br>4. Big head + body<br>5. Head + big body |
| Quality (optional) | 1. Automatic, 2. Capability first, 3. Quality first |

Referring to Table 4, the request signal for generating the avatar may necessarily include a package name of an application generating the request signal, and may optionally include various pieces of information necessary to generate the avatar. For example, the request signal may include the type of the external electronic device 210 (e.g., a wearable watch, AR glasses, a phone, a VR, or a PC). When the type of the external electronic device 210 is identified, the processor 120 may determine specification and capability information about the external electronic device 210. For example, the processor 120 may infer specification and capability information corresponding to the type of the external electronic device 210. The request signal may include information about the size (e.g., 1024*1024, 512*512, or 128*128) of a display (e.g., the size of an actual physical display). When converting the first content (e.g., the first avatar) stored in the memory 130 into the second content, the processor 120 may perform a downscale operation when overall quality is reduced, and may perform an upscale operation when the overall quality is increased. The request signal may include information about whether to include a blend shape effect. The request signal may request conversion of only a designated part of body parts of the avatar. Referring to FIGS. 7A to 7F, the processor 120 may individually configure the avatar by each body part. The request signal may include quality information (e.g., automatic, capability first, or quality first) when generating the avatar.

In operation 803, the processor 120 may identify whether an avatar corresponding to the request signal exists in the memory 130. For example, when the electronic device 101 is previously linked with a different electronic device and executes an avatar-related application, the electronic device 101 may have generated an avatar for the different electronic device and may have stored the avatar in the memory 130.

When the avatar corresponding to the request signal matches an avatar stored in the memory 130 in operation 803, the processor 120 may transmit the matched avatar stored in the memory 130 to the external electronic device 210 in operation 805.

When the avatar corresponding to the request signal does not match the avatar stored in the memory 130 in operation 803, the processor 120 may identify the avatar-related information according to the request signal in operation 807. Table 4 illustrated above shows the avatar-related information. According to an embodiment, the request signal may include at least one of the type of the external electronic device 210, a display size of the external electronic device 210, a desired body part of the avatar, and quality information about the avatar.

In operation 809, the processor 120 may generate an avatar, based on the avatar-related information. For example, when the external electronic device 210 is a wearable watch, the generated avatar may be configured with an optimized quality in the wearable watch. The processor 120 may map the generated avatar to the external electronic device 210, and may store the avatar in the memory 130. According to another embodiment, when the electronic device 101 receives an avatar request signal from a different electronic device that is a wearable watch, the electronic device 101 may compare and analyze the avatar stored in the memory 130, and may transmit the avatar stored in the memory 130 to the different electronic device when the avatar matches the avatar request signal.

In operation 811, the processor 120 may transmit the avatar generated in response to the external electronic device 210 to the external electronic device 210. When the generated avatar is displayed through a display of the external electronic device 210, the avatar may be configured with an optimal quality.

According to an embodiment, the electronic device 101 may receive a signal for requesting generation of an avatar from the external electronic device 210, and may generate an optimized avatar corresponding to the external electronic device 210 in response to the received signal. The electronic device 101 may transmit the generated avatar to the external electronic device 210 so that the avatar is configured with an optimal quality when displayed through the display of the external electronic device 210.

A method according to various embodiments may include generating at least one first content corresponding to a user using a camera module 180, converting the at least one first content into at least one second content, based on capability-related information about an external electronic device 210 and information related to content, and transmitting the at least one second content to the external electronic device 210.

According to an embodiment, the first content and the second content may include at least one of an avatar replacing the user, virtual content, a virtual character, and a virtual icon, which are generated based on an image captured using the camera module 180.

According to an embodiment, the capability-related information about the external electronic device 210 may include specification information and capability information about at least one component forming the external electronic device 210.

According to an embodiment, the information related to the content may include texture information about the content, texture size information, texture format information, and/or information about a part forming the content.

According to an embodiment, the texture information about the content may include at least one of albedo, normal, metallic, and/or roughness, which represent a texture of the content, and the method may further include determining optimized texture size information according to the texture information.

According to an embodiment, the texture format information about the content may include a compression method for minimizing quality deterioration and/or a lossy compression method in which quality deterioration occurs, in an operation of compressing the content to be converted into a file format, and the information about the part forming the content may include at least one of a head part, a body part, and/or a bottom part.

According to an embodiment, the method may further include individually converting the first content in response to each body part forming the first content, based on the capability-related information about the external electronic device 210 and the information related to the content, and generating the second content by integrating each of the converted body part.

According to an embodiment, the method may further include generating third content corresponding to the external electronic device 210, based on the capability-related information about the external electronic device 210 and the information related to the content included in a request signal, in response to the request signal from the external electronic device 210, and transmitting the third content to the external electronic device 210 through the communication module 190.

According to an embodiment, the method may further include identifying whether the third content is stored in the memory 130 in response to the request signal from the external electronic device 210, and transmitting the third content stored in the memory 130 to the external electronic device 210 when the third content is stored in the memory 130.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a communication circuitry;
   a camera;
   memory configured to store capability-related information of an external electronic device; and
   a processor operatively connected to the communication circuitry, the camera, and the memory, wherein the memory is further configured to store instructions that, when executed by the processor, cause the electronic device to:
generate a first avatar corresponding to a user using the camera,
identify first configuration information corresponding to each of a plurality of body parts based on the first avatar,
change the first configuration information into at least one piece of second configuration information determined based on the capability-related information of the external electronic device, wherein the at least one piece of second configuration information comprises texture information about each of the plurality of body parts, texture size information determined based on the texture information, or texture format information determined based on the texture information, and is determined separately for each of the plurality of body parts,
generate a second avatar different from the first avatar based on the at least one piece of second configuration information corresponding to each of the plurality of body parts, and
transmit the second avatar to the external electronic device through the communication circuitry.

2. The electronic device of claim 1, wherein the first avatar and the second avatar comprise at least one of an avatar replacing the user, virtual content, a virtual character, or a virtual icon, which are generated based on an image captured using the camera.

3. The electronic device of claim 1, wherein the capability-related information of the external electronic device comprises specification information and capability information about at least one component forming the external electronic device.

4. The electronic device of claim 1,
wherein the texture information about the first avatar comprises at least one of albedo, normal, metallic, or roughness, which represents a visual texture.

5. The electronic device of claim 1, wherein the texture format information about the first avatar comprises a compression method for minimizing quality deterioration and a lossy compression method in which quality deterioration occurs, in an operation of compressing an avatar to be converted into a file format.

6. The electronic device of claim 1,
wherein the first configuration information related to the first avatar further comprises information about a part forming the first avatar, and
wherein the information about the part forming the first avatar comprises at least one of a head part, a body part, or a bottom part.

7. The electronic device of claim 1, wherein the processor is further configured to:
generate third avatar corresponding to the external electronic device, based on the capability-related information of the external electronic device, in response to a request signal of the external electronic device; and
transmit the third avatar to the external electronic device through the communication circuitry.

8. The electronic device of claim 7, wherein the processor is further configured to:
identify whether the third avatar is stored in the memory in response to the request signal of the external electronic device; and
transmit the third avatar stored in the memory to the external electronic device in response to the third avatar being stored in the memory.

9. The electronic device of claim 1, wherein the external electronic device comprises at least one of a wearable watch, augmented reality (AR) glasses, a smartphone, a virtual reality (VR) device, or a personal computer (PC).

10. The electronic device of claim 1, wherein the at least one piece of second configuration information comprises information about each of the plurality of body parts indicating which of the plurality of body parts to include or exclude based on the capability-related information of the external electronic device.

11. A method comprising:
generating a first avatar corresponding to a user using a camera;
identifying first configuration information corresponding to each of a plurality of body parts based on the first avatar;
changing the first configuration information into at least one piece of second configuration information determined based on capability-related information of an external electronic device, wherein the at least one piece of second configuration information comprises texture information about each of the plurality of body parts, texture size information determined based on the texture information, or texture format information determined based on the texture information, and is determined separately for each of the plurality of body parts;
generating a second avatar different from the first avatar based on the at least one piece of second configuration information corresponding to each of the plurality of body parts; and
transmitting the second avatar to the external electronic device.

12. The method of claim 11, wherein the first avatar and the second avatar comprise at least one of an avatar replacing the user, virtual content, a virtual character, or a virtual icon, which are generated based on an image captured using the camera.

13. The method of claim 11, wherein the capability-related information of the external electronic device comprises specification information and capability information about at least one component forming the external electronic device.

14. The method of claim 11,
wherein the texture information about the first avatar comprises at least one of albedo, normal, metallic, or roughness, which represent a visual texture.

15. The method of claim 11,
wherein the texture format information about the first avatar comprises a compression method for minimizing quality deterioration and a lossy compression method in which quality deterioration occurs, in an operation of compressing an avatar to be converted into a file format,
wherein the first configuration information related to the first avatar further comprises information about a part forming the first avatar, and
wherein the information about the part forming the first avatar comprises at least one of a head part, a body part, or a bottom part.

16. The method of claim 11, further comprising:
generating third avatar corresponding to the external electronic device, based on the capability-related information of the external electronic device, in response to a request signal of the external electronic device; and transmitting the third avatar to the external electronic device through a communication circuitry.

17. The method of claim 16, further comprising:

identifying whether the third avatar is stored in a memory in response to the request signal of the external electronic device; and transmitting the third avatar stored in the memory to the external electronic device in response to the third avatar being stored in the memory.

18. The method of claim 11, wherein the at least one piece of second configuration information comprises information about each of the plurality of body parts indicating which of the plurality of body parts to include or exclude based on the capability-related information of the external electronic device.

* * * * *